under conditions which will be described hereinafter. The novel compounds of this invention and mixtures thereof can also be obtained when tripotassium cyanurate is continuously chlorinated under certain specific pH and temperature conditions which will be described in greater detail hereinafter. One of the compounds of this invention can also be prepared by bringing together and reacting monopotassium dichloroisocyanurate and hydrochloric acid under certain conditions which are set forth in greater detail hereinafter.

United States Patent Office 3,350,317
Patented Oct. 31, 1967

3,350,317
STERILIZING, DISINFECTING, OXIDIZING AND BLEACHING COMPOSITION
William F. Symes, Webster Groves, Mo., assignor to Monsanto Company, St. Louis, Mo., a corporation of Delaware
No Drawing. Filed Sept. 24, 1965, Ser. No. 490,134
7 Claims. (Cl. 252—99)

ABSTRACT OF THE DISCLOSURE

The present invention relates to a sterilizing, disinfecting, oxidizing, and/or bleaching composition which consists of a mixture of one or more organic compounds such as essential oils, organic optical brighteners, organic tarnish inhibitors, and organic sequestering agents and a potassium-containing chloroisocyanurate complex compound such as [(mono-trichloro) tetra- (mono-potassium dichloro-)]penta-isocyanurate, (mono-trichloro) (mono-potassium dichloro) di-isocyanurate, and mixtures thereof. Such potassium-containing complex compound is usually employed in amounts of from about 0.1% to about 98% by weight of the mixture. The above compositions may also contain an inorganic detergent builder salt such as sodium tripolyphosphate, sodium silicate, and the like.

The present invention which relates to a novel class of complex compounds containing potassium and available chlorine and compositions containing these compounds was also disclosed, in part, in my co-pending application for Letter Patent, Ser. No. 329,393 (now United States Patent No. 3,256,199), filed in the U.S. Patent Office Dec. 10, 1963, which is in turn a division of U.S. application Ser. No. 37,565, filed June 21, 1960, now U.S. Patent No. 3,150,132. The disclosure contained in the present application should be taken in conjunction with said applications for Letters Patent Ser. No. 329,393 and Ser. No. 37,565 and considered as a continuation-in-part of said applications.

This invention relates to new chlorocyanuric acid compounds and to mixtures thereof, which compounds contain potassium and available chlorine, and to methods of preparing such compounds and mixtures thereof. The invention further relates to a new class of compounds which contain potassium and available chlorine and which have unusual resistance to loss of such chlorine. The invention also relates to formulations or composition containing such compounds which formulations or compositions have improved stability relative to retention of available chlorine, and which are useful, for example, in bleaching, sterilizing, oxidizing and disinfecting operations.

Chattaway and Wadmore in the Journal of the Chemical Society, vol. 81, pages 200–202 (1902), point out that trichloroiminocyanuric acid (also known as trichlorocyanuric acid or trichloroisocyanuric acid) can be prepared by dissolving cyanuric acid in the theoretical quantity of a 5 percent solution of caustic potash and passing a rapid stream of chlorine through the liquid cooled to 0° C. This article further discloses that trichloroiminocyanuric acid separates as a heavy, white crystalline powder which is obtained perfectly pure by washing a few times with water and drying rapidly on a water bath, and when using about 3 grams of cyanuric acid, a yield of more than 90 percent of the theoretical is obtained. If a larger quantity than this be used or the temperature be allowed to rise, the yield is much diminished and the product is more or less impure.

Hardy in U.S. Patent 2,607,738 and Re. 24,412 teaches in column 3, line 71, through column 4, line 8, that trichlorocyanuric acid is prepared by dissolving cyanuric acid in the theoretical quantity of a 5% solution of caustic potash or soda and treatitng the resulting solution with chlorine until 3 atoms of the alkali have been substituted by chlorine.

It is one object of the present invention to provide novel anhydrous crystalline, potassium-containing chloroisocyanurate complex compounds and mixtures thereof and characterized in having distinct, available chlorine contents and in having utility in bleaching, sterilizing or disinfecting operations.

It is another object of this invention to provide processes for producing such novel compounds and mixtures thereof.

It is a further object of this invention to provide formulations and compositions containing these compounds and mixtures thereof which formulations and compositions have exceptional stability with reference to retention of available chlorine, and which are useful, for example for bleaching, sterilizing, or disinfecting purposes.

The present invention is concerned, in part, with novel, anhydrous, crystalline potassium-containing chloroisocyanurate complex compounds and mixtures thereof which can be obtained, for example, according to one embodiment of this invention by bringing together and reacting trichloroisocyanuric acid and monopotassium dichloroisocyanurate in certain molecular proportions and One of the novel compounds of this invention is an anhydrous, crystalline solid having a distinct X-ray diffraction pattern and the general formula

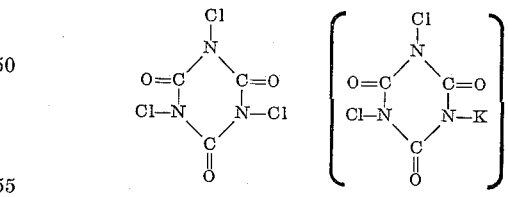

and is further characterized in that it has an available chlorine content of 66.4%, is soluble in distilled water at 25° C. to an extent of about 2.5% by weight; the pH of a saturated aqueous solution thereof being about 4.3. The above-described compound as prepared in accordance with this inventon usually has an available chlorine content in the range of 66% and 67% and decomposes without melting in the range of 260–275° C. Crystals of this compound exhibit a distinct elemental analysis, which is described in Table I immediately following Example III. For convenience in description the above-described compound will be designated hereafter either as Compound I or as [(mono-trichloro,) tetra(monopotassium dichloro,)]penta-isocyanurate.

X-ray diffraction analysis of Compound I shows a unique X-ray diffraction pattern distinct from the X-ray diffraction patterns of trichloroisocyanuric acid, monopotassium dichloroisocyanurate, or monohydrogen dichloroicocyanuric acid (also known as dichloroisocyanuric acid). The X-ray diffraction pattern of Compound I is shown in Table II, which follows Example III.

The infrared absorption spectrum of Compound I is, in part, common to the infrared absorption spectrum of trichloroisocyanuric acid and such absorption spectrum is also, in part, common to the infrared absorption spectrum of monopotassium dichloroisocyanurate. The infrared absorption spectrum of Compound I substantially demonstrates that one moiety of Compound I consists of trichlorocyanuric acid and that another moiety of this novel cyanurate compound is composed of monopotassium dichloroisocyanurate, that is to say, the infrared absorption spectrum of Compound I is substantially identical to a substantially uniform physical mixture of 1 mole of trichloroisocyanuric acid and 4 moles of monopotassium dichloroisocyanurate.

Another new cyanurate compound of this invention is also an anhydrous, crystalline material but has the general formula:

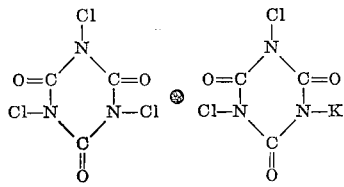

and is further characterized in that it has an available chlorine content of 75.8%, is soluble in water at 25° C. to an extent of about 1.0% by weight; the pH of an aqueous saturated solution thereof being about 4.1. This compound as prepared in accordance with this invention usually has an available chlorine content of from 75% to 77% and undergoes decrepitation when heated to 170° C.–215° C. and decomposes without melting in the region of 260° C–275° C. For convenience in description this compound is hereinafter designated as either Compound II or (trichloro,) (monopotassium dichloro,) di-isocyanurate.

Crystals of Compound II exhibit a distinct elemental analysis, which analysis is compared with the calculated theoretical elemental content in Table I, immediately following Example III.

X-ray diffraction analysis of Compound II reveals a unique X-ray diffraction patterns distinct from the X-ray pattern of Compound I hereinbefore described, and also distinct from the X-ray diffraction patterns of trichloroisocyanuric acid, dichloroisocyanuric acid or monopotassium dichloroisoycyanurate. This pattern is shown in Table V following Example III.

The infrared absorption spectrum of Compound II like that of Compound I is in part common to the infrared absorption spectrum of trichloroisocyanuric acid and is also in part common to the infrared absorption spectrum of monopotassium dichlorocyanurate. However, the intensity of that part of the infrared absorption spectrum which corresponds to the absorption spectrum of trichloroisocyanuric acid is greater in the Compound II absorption spectrum than in the absorption spectrum of Compound I.

The novel compounds of the present invention may be prepared singly (in pure form) or in the form of mixtures by at least two different methods. One such method comprises bringing together and reacting monopotassium dichloroisocyanurate and trichloroisocyanuric acid in an inert liquid in a reaction zone and isolating the said compound or mixture of compounds therefrom. As will be seen hereinafter, it is possible by varying and controlling the pH of the inert liquid and the molecular ratio between monopotassium dichloroisocyanurate and trichloroisocyanuric acid to prepare either Compound I or Compound II, in pure form, or mixtures of these compounds.

This method of making the novel compounds and mixtures of the novel compounds of this invention, preferably comprises bringing together and reacting in a reaction zone, an aqueous solution containing from about 5% to about 12% by weight of monopotassium dichloroisocyanurate and from about 15% to about 36% by weight of trichloroisocyanuric acid dissolved in an inert organic solvent such as acetone, methyl or ethyl alcohol or the like wherein 15%–36%, more preferably 20–25%, by weight of said solution is composed of trichloroisocyanuric acid.

When it is desired to prepare Compound I only, the amount and concentration of the solutions of monopotassium dichlorocyanurate and trichlorocyanuric acid in the reaction zone should be such that the molecular ratio of monopotassium dichloroisocyanurate to trichloroisocyanuric acid is in excess of 4 to 1 and preferably greater than 5 to 1 and more preferably between 6 to 1 and 8 to 1. Under these conditions essentially pure Compound I separates from the liquid phase of the reaction mixture as an insoluble precipitate which can be separated from the unreacted materials which remain in solution.

When it is desired to produce Compound II, it is generally preferred to bring together and react an aqueous solution of monopotassium dichloroisocyanurate containing 5%–12%, more preferably 6%–8% by weight of monopotassium dichloroisocyanurate and trichloroisocyanuric acid dissolved in an inert organic solvent such as acetone or methyl or ethyl alcohol wherein 15%–36%, more preferably 30%–35% by weight of the solution consists of trichloroisocyanuric acid, the amounts and concentrations of such solutions in the reaction zone being preferably adjusted so that the molecular ratio of monopotassium dichloroisocyanurate to trichloroisocyanuric acid is not more than 1.3 to 1 and is more desirably between 1.15 to 1 and 1.25 to 1.

It is possible to prepare various mixtures of Compounds I and II by altering the quantities and/or concentrations of the above-described solutions in such a manner as to provide a molecular ratio of monopotassium dichloroisocyanuric acid and trichloroisocyanuric acid in the range of from 3.95:1 to 1.35:1. However, it is preferred to make mixtures of Compounds I and II by bringing together an aqueous solution consisting of from 10% to 25% by weight of monopotassium dichloroisocyanurate and slurry containing from 15 to 60 parts by weight of trichloroisocyanuric acid and from 40 to 85 parts by weight of water; the quantities of the solution and slurry referred to being controlled to provide a molecular ratio within such range. The particular ratio used will depend on the relative amounts of Compounds I and II which may be desired in the mixture.

In all of the above reactions, which are preferably carried out at a temperature within the range of 5° C.–50° C., a precipitate forms (usually as white, fine, particulate crystals) which can be separated from the bulk of the liquid phase of the reaction mixture by filtration, centrifugation and the like. The precipitate is then preferably dried, although it may be used directly in the wet state. This precipitate is, of course, Compound I, Compound II or mixtures thereof, depending on the ratio of reactants, etc. as described above. If the product is desired to contain Compound I, Compound II or mixtures thereof, which are free of impurities occasioned by the reaction, the reaction product can be washed with water prior to drying to remove such impurities.

The above-described process can be carried out either as a batch process or as a continuous process but it is preferred to use a continuous process since the latter is more economical.

In another embodiment of this invention, still another method for preparing the above-described compounds or their mixtures may be used and such method, in general, comprises continuously introducing chlorine and an aqueous solution of tripotassium cyanurate into a reaction zone containing an aqueous slurry of either of the above-described novel compounds or a mixture of said compounds. Either compound or mixtures of both compounds can be prepared by varying and controlling the rate at which the chlorine is introduced into the reaction zone, said rate being controlled to maintain a pH of below about 6.0 and preferably not less than 2.1, thereby forming additional quantities of aqueous slurry of the novel compound or mixture of compounds in the reaction zone and continuously removing a portion of said aqueous slurry from said reaction zone. Such novel compound or mixture of compounds can then be separated from the bulk of the aqueous phase of the slurry thus removed.

In accordance with this process of the present invention an aqueous slurry of said Compounds I or II or mixtures thereof is introduced into a reaction zone. Such slurry may be prepared, for example, by the first process herein described. Chlorine and an aqueous solution of tripotassium cyanurate are then introduced continuously into such slurry in the reaction zone. The chlorine can be continuously introduced in such slurry as a liquid or a gas but is preferably present as a gas or in a partially gaseous state. The chlorine is continuously dispersed through the aqueous slurry and newly introduced tripotassium cyanurate in the slurry, preferably by mechanical dispersing means such as a continuous high shear mixing or agitation, to maintain the solution at a pH at any given level in the range of less than pH 6.0 to about pH 2.1, depending upon whether Compound I, mixtures of Compounds I and II or Compound II is to be made. The particular pH is maintained by adjusting the concentration of the cyanurate solution and the rate at which the chlorine is dispersed into such aqueous slurry in the reaction zone.

During the admixture of the chlorine and the cyanurate solution in the aqueous slurry, the resulting reaction mixture is continuously maintained at a temperature of from 0° C.–50° C., preferably about 25° C.–35° C. The temperature used may be below 25° C. but there is no advantage and some loss of yield may be experienced at these temperatures due to incomplete chlorination. Although temperatures of 35° C.–50° C. can be used there is also a loss of yield at temperatures above 35° C. and it is desirable to maintain the temperature of the aqueous slurry between 25° C.–35° C. and preferably between 28° C.–32° C. for optimum yields. Temperatures above 50° C. should be avoided due to excessive yield losses and decomposition of the triazine ring of the cyanurate.

Under the desirable conditions of temperature and pH, a substantially complete reaction takes place and there is thus formed additional quantities of slurry at a specified pH, which pH is within the range of 6.0 to 2.1 as described above. This slurry comprises a slurry of Compound I suspended in the liquid reaction product where the pH has been held within the range of about 6.04–4.3. Mixtures of Compound I and Compound II are produced when the pH of the slurry during the introduction of chlorine and tripotassium cyanurate is within the range of about 3.5–4.2. Compound II is formed when the pH of the slurry is held during the chlorination procedure at a pH within the range of about 2.1–3.4. The above slurries are substantially insoluble in the aqueous medium, which medium is substantially an aqueous solution of potassium chloride, which solution has the pH values referred to above.

If the pH in the reaction zone is generally permitted to remain above 6.0, monopotassium dichloroisocyanurate of a mixture of monopotassium dichloroisocyanurate and Compound I may be formed. On the other hand, it is usually difficult to obtain a pH below 2.1, because of the buffering action of the dissolved reaction products even when large excesses of chlorine are employed.

The compound or mixtures of compounds formed in the above-described aqueous slurry are continuously removed from the reaction zone together with a portion of the aqueous medium, preferably so as to maintain the volume of the aqueous slurry in the reaction zone substantially constant. The product, in the slurry removed from the reaction zone, is next separated from the bulk of the aqueous medium with which it is associated in the aqueous slurry, by filtration, decantation, centrifugation or the like and may be dried or used, in certain applications, in the wet or undried state. However, if the product is desired with a low or zero KCl content, it is first preferably washed with water to remove the potassium chloride contained therein and is then dried (if a dry product is desired) to provide a dry or substantially dry solid product containing from 0–4%, preferably below 1.5%, by weight of moisture.

It has also been found that pure Compound I may be particularly and exclusively prepared in pure form by introducing an aqueous solution of hydrochloric acid into a reaction zone containing an aqueous solution of monopotassium dichlorocyanurate, the rate at which said acid is introduced in said zone being a rate sufficient to maintain a pH within the range of pH 4.6–5.0 and preferably pH 4.8.

In accordance with this process of the present invention, an aqueous solution containing from about 5%–9%, preferably 9% by weight, of monopotassium dichloroisocyanurate is continuously introduced into a reaction zone simultaneously with an aqueous solution of hydrochloric acid containing from about 5%–15%, preferably 10% by weight of HCl. The solutions are introduced and subjected to mixing at rates sufficient to provide and maintain a pH within the range of 4.6–5.0 preferably a pH of 4.8. Compound I forms almost immediately as a fine white crystalline precipitate. This precipitate can be allowed to settle to the bottom of the reaction mixture and, in any event, can be separated from the bulk of the reaction mass by decantation, centrifugation, filtration and the like. The resulting Compound I can then be dried. However, it is preferable to remove reaction impurities by washing the compound with water prior to use or prior to the drying step.

The above reaction is preferably carried out at a temperature within the range of 5° C.–50° C. This process can be practiced either as a batch or as a continuous process, but it is preferred to use a continuous process since the latter is more economical.

A further understanding of the products, compositions and processes of the present invention will be obtained from the following specific examples which are intended to illustrate this invention but not to limit the scope thereof.

EXAMPLE I

[(Mono-trichloro,)tetra-(monopotassium dichloro,)] penta-isocyanurate or Compound I Sixteen grams of monopotassium dichloroisocyanurate were dissolved in 194 grams of water and placed in a 300 ml. Pyrex beaker. To this solution was added 2.0 grams of trichloroisocyanuric acid dissolved in 8.0 ml. of acetone and the resulting mixture, which mixture had a pH of about 4.9, was stirred at about 300 r.p.m. with a standard electric stirrer for about ten minutes. A white precipitate, which formed almost immediately, was removed by filter paper filtration in a Büchner funnel. The precipitate, in the form of a filter cake, was successively washed three times with three milliliter increments of water and was aspirated for 5 minutes to remove as much moisture as possible. The filtrate which consisted essentially of water, acetone, and monopotassium dichlorocyanurate was discarded. The filter cake was then dried to constant weight in an oven set at 100° C.

A white dry crystalline solid weighing 4.94 grams was obtained. An elemental analysis of the crystalline compound is given in Table I which follows Example III.

X-ray diffraction patterns were obtained using the Instrument and method described in Phillips Technical Reviews, vol. 10, p. 1, published in 1948. X-ray diffraction analysis of the above-described white crystalline solid showed a diffraction pattern which was unique and distinct from diffraction patterns shown by either trichloroisocyanuric acid or monopotassium dichloroisocyanurate. A typical diffraction pattern for this novel compound, [(mono-trichloro,) tetra-(monopotassium dichloro,)] penta-isocyanurate, is shown in Table II following Example III.

The infrared absorption spectrum of the above-described crystalline solid was determined by use of a Beckman IR-4 Infrared Spectrophotometer according to the method of Stimson et al. in the Journal of the American Chemical Soc., vol. 74, p. 1805 (1952), and will be discussed in greater detail at the end of Example III.

EXAMPLE II

[(Mono-trichloro,) tetra-(monopotassium dichloro,)] penta-isocyanurate or Compound I Sixteen grams of monopotassium dichloroisocyanurate were dissolved in 194 grams of water in a 500 ml. Erlenmeyer flask. The resulting 210 grams of solution had a pH of 6.8. To this solution was added a 10% by weight solution of hydrochloric acid in an amount sufficient to lower the pH from 6.8 to 4.8. As the 10% hydrochloric acid solution was added a fine white crystalline precipitate formed in the solution and settled in the bottom of the Erlenmeyer flask. The crystalline material was filtered, washed and dried to constant weight at 100° C. as in Example I. The filtrate which contained a mixture of monopotassium dichloroisocyanurate and dichloroisocyanuric acid was discarded.

The yield of white crystalline material was 1.6 grams. An elemental analysis of the crystalline compound is shown in Table I, following Example III.

X-ray diffraction analyses of the above-described material were obtained as in Example I and the typical diffraction pattern is shown in Table II following Example III.

The infrared absorption spectrum of the above-described crystalline material was determined as in Example I and is discussed after Example III.

EXAMPLE III

[(Mono-trichloro,) tetra-(monopotassium dichloro,)] penta-isocyanurate or Compound I Approximately 900 ml. of an aqueous slurry having a pH of about 4.5 and containing about 10% by weight of Compound I, prepared according to the method of Example I, was charged to a chlorination vessel, which vessel comprised a jacketed cylindrical glass container having an internal diameter of 5 inches and an internal height of 13 inches which container was supplied with three equidistantly spaced vertical baffles of 1 inch width, spaced radially inward 1 inch from the inside wall of the container. The total capacity of the container was about 3.5 liters of solution. Agitation was provided by a shaft mounted coincident with the vertical axis of the container and provided with a six bladed turbine propeller of 2 inch diameter spaced 2 inches above the inside of the bottom of the container and a second six bladed turbined propeller of 2 inch diameter spaced 5 inches above the first mentioned propeller. The shaft and propellers were rotated at 2300 revolutions per minute or a propeller tip speed of 1200 feet per minute. The container was also provided with a tube for introducing aqueous tripotassium cyanurate into the bottom of the container beneath the lowest propeller.

The container was also provided with an "outlet" tube extending vertically downward into the container a distance of 10 inches from the bottom of the container for the removal of reaction products. At such distance the top surface of the 900 ml. of slurry was in contact with the "outlet" tube and enabled the maintainment of a constant volume of 900 ml.

Four hundred seventy-five grams of potassium hydroxide was dissolved in 4.2 liters of water and the resulting product mixed with 460 grams of cyanuric acid to form an aqueous solution of tripotassium cyanurate. The amount of potassium hydroxide employed was about 0.14 mol in excess of that required to form tripotassium cyanurate and the pH of the cyanurate solution was about 13.7. The resulting solution was filtered and cooled to a temperature of 10° C. This solution of tripotassium cyanurate was then introduced continuously into the aqueous slurry in the container, with agitation, at the speed described above, and concurrently, gaseous chloride was introduced into the aqueous slurry in an amount and rate sufficient to maintain the pH at 4.5 and to maintain a constant temperature of 29° C. The volume of the aqueous slurry in the container was maintained constant at 900 ml. by continually pumping a portion of the aqueous slurry, which contained a portion of Compound I, from the vessel through the removal tube. The rate of pumping was a rate sufficient to permit the chlorination of 40 ml. of the slurry per minute while maintaining the volume constant at 900 ml. and the resulting chlorinated slurry, which contained Compound I, was collected in a glass carboy. The continuous chlorination reaction was continued for 1 hour or until 3300 ml. of the liquid slurry had been chlorinated. The collected chlorinated slurry (3300 ml.) was then filtered through filter paper on a Buchner funnel; the resulting filter cake washed three times with 20 ml. increments of distilled water and dried to constant weight in an over set at 100° C. The product consisted of 330 grams of a white crystalline material with a buff colored tinge which quantity amounted to a product yield of 75% based on the cyanuric acid employed. This product was found to contain 66.8% of available chlorine. A typical elemental analysis of the crystalline compound is shown in Table I below.

X-ray diffraction patterns of the above-described compound were obtained as described in Example I, a typical pattern being included in Table II. The infrared absorption spectrum of this compound was determined as in Example I and will be discussed below.

The three compounds prepared in Examples I, II and III had identical solubilities in water, that is to say each was soluble to the extent of about 2.5% by weight in distilled water at a temperature of about 25° C. and the pH of each of the saturated solutions of these compounds in water was 4.3. Each of the three compounds decomposed without melting in identical ranges of 260–275° C.

Elemental analyses of the above-described compounds showed that these compounds were substantially identical with respect to carbon, nitrogen, chlorine and potassium content and were in conformance with amounts theoretically calculated for such elements from the hereinbefore referred to formula of Compound I, as shown in the following table.

TABLE I.—ELEMENTAL ANALYSES OF COMPOUND I

| Element | Calculated Theoretical (Percent) | Found | | |
|---|---|---|---|---|
| | | Example I (Percent) | Example II (Percent) | Example III (Percent) |
| Carbon | 15.29 | 15.40 | 15.27 | 15.24 |
| Nitrogen | 17.84 | 17.96 | 17.95 | 18.03 |
| Chlorine | 33.19 | 33.15 | 33.14 | 32.92 |
| Potassium | 13.29 | 13.35 | 14.00 | 13.36 |

X-ray diffraction analyses of the compounds prepared according to Examples I, II and III were also substantially the same. A typical X-ray diffraction pattern of the compounds of the above examples showing the principal angles and lines is presented in Table II.

TABLE II.—TYPICAL X-RAY DIFFRACTION ANALYSES—COMPOUND I

[Includes only relative intensities greater than 10%]

| Angle (2θ) | Interplanar Spacing | Relative Intensity |
|---|---|---|
| 22.0 | 4.04 | 23 |
| 22.4 | 3.97 | 54 |
| 24.9 | 3.57 | 22 |
| 27.15 | 3.28 | 100 |
| 29.2 | 3.06 | 35 |
| 29.65 | 3.01 | 19 |
| 33.8 | 2.65 | 60 |

The available chlorine content of each of the compounds of the above examples were essentially the same and also essentially the same as the theoretically calculated available chlorine content as shown in the following table.

TABLE III.—AVAILABLE CHLORINE—COMPOUND I

Compound:            Available chlorine (percent)
Theoretical (calculated) _____ 66.38
Example I _____ 66.28
Example II _____ 66.30
Example III _____ 66.28

The infrared absorption spectra of the three compounds prepared as described above were substantially alike and essentially the same as the infrared absorption spectrum of a physical admixture of 20% by weight of dry trichloroisocyanuric acid and 80% by weight of dry monopotassium dichloroisocyanurate demonstrating that each of the above new compounds is composed of two moieties, one containing trichloroisocyanuric acid and one containing monopotassium dichloroisocyanurate in a molecular ratio of 1:4.

Although prepared by distinctly different processes the compounds of Examples I through III have been identified as being chemically identical and conform to the material hereinbefore designated as Compound I. The above-described amounts of precursor compounds which were consumed (that is, tripotassium cyanurate, chlorine, hydrochloric acid and trichloroisocyanuric acid) in the synthesis of the respective compounds of Examples I through III, the identity of the elemental analyses, the available chlorine content, X-ray diffraction patterns, and infrared absorption spectra, made it evident that these products were a single, novel, complex compound having 2 moieties, the one moiety consisting of 4 molecular proportions of monopotassium dichloroisocyanurate and the other moiety consisting of 1 molecular proportion of trichloroisocyanuric acid.

EXAMPLE IV (Mono-trichloro,)(monopotassium dichloro,) di-isocyanurate or Compound II Twelve and eight-tenths grams of monopotassium dichloroisocyanurate was dissolved in 187.2 grams of water, placed in a 300 ml. beaker and the resulting product mixed with 10 grams of trichloroisocyanuric acid dissolved in 35 ml. of acetone. The resulting mixture which had a pH of 2.8 was stirred at 300 r.p.m. with a standard electric stirrer for about 5 minutes. A white precipitate, which formed almost immediately, was removed by filter paper filtration in a Büchner funnel. The precipitate, in the form of a filter cake, was successively washed three times with three milliliter increments of water, and was aspirated for 5 minutes to remove as much moisture as possible. The filtrate was discarded. The filter cake was dried to constant weight in an oven set at 100° C.

A white dry crystalline solid weighing 14.96 grams was obtained, the elemental analyses of which is shown in Table IV, immediately following Example V.

X-ray diffraction analysis showed a diffraction pattern which was unique and distinct from the patterns of the materials of Examples I through III (Compound I), monopotassium dichloroisocyanurate, and trichloroisocyanuric acid. The principal angles and lines of the X-ray diffraction pattern of the second new material (Compound II) are shown in Table V following Example V.

EXAMPLE V (Mono-trichloro)(monopotassium dichloro) di-isocyanurate or Compound II An aqueous slurry of Compound II prepared as described in Example IV was placed in the chlorination vessel described in Example III. Tripotassium cyanurate and gaseous chlorine were simultaneously introduced into this slurry of Compound II in the chlorination vessel, otherwise using the procedure of Example III except that the rate at which the chlorine gas was introduced into the reaction vessel was increased to maintain a pH of 3.4 during the chlorination, during which 3000 grams of an aqueous solution containing 13.2% by weight of tripotassium cyanurate was chlorinated in the presence of the slurry of Compound II. The slurry was removed from the reaction vessel, washed and dried as in Example III and a yield of 345 grams of a white crystalline solid was obtained.

Another portion of aqueous slurry of Compound II, prepared as described in Example IV, was placed in the chlorination vessel and the above-described procedure was repeated except that the rate at which the chlorine gas was introduced into the reaction vessel was increased to maintain a pH of 2.8 during the chlorination procedure which was otherwise the same as the procedure described above. At the end of the process, 347 grams of a white crystalline solid was obtained.

The two materials were identical in appearance and properties and were substantially the same as the material obtained in Example IV. Elemental analyses were run on each material and are shown in Table IV. X-ray diffraction patterns of the two materials were obtained as in Example I, a typical pattern being included in Table V.

Infrared absorption spectra of the above-described crystalline materials, obtained as in Example I, will be described in detail hereinafter.

The compounds prepared in Examples IV and V had identical solubilities in water and decomposed without melting at a temperature range of between 260–275° C. (Table VII). During the melting point determinations, each of the compounds underwent a decrepitation reaction over a temperature range of between 170° C.–215° C.

The pH of 1% by weight aqueous solution of each of the compounds of Examples IV and V was pH 4.1 at 25° C. and such 1% aqueous solutions represented the identical solubility limit of each of these compounds.

Elemental analyses of the above-described compounds showed these compounds to be different from the compounds of Examples I–III. The compounds of Examples IV and V, however, are substantially the same with respect to carbon, nitrogen, chlorine, and potassium content and are in conformance with those amounts theoretically calculated for the formula (hereinbefore referred to) of Compound II as indicated in the following table:

TABLE IV.—ELEMENTAL ANALYSES OF COMPOUND II

| Element | Calculated Theoretical (Percent) | Found | | |
|---|---|---|---|---|
| | | Example IV (Percent) | Example V (pH 3.5) (Percent) | Example V (pH 2.8) (Percent) |
| Carbon | 15.36 | 15.21 | 14.85 | 15.24 |
| Nitrogen | 17.93 | 17.85 | 17.81 | 17.90 |
| Chlorine | 37.88 | 37.68 | 37.50 | 37.75 |
| Potassium | 8.34 | 8.43 | 8.30 | 8.66 |

X-ray diffraction analyses of the compounds prepared according to Examples IV and V were also substantially alike. A typical X-ray diffraction pattern of the compounds of the above examples showing the principal angles and lines is as follows.

TABLE V.—TYPICAL X-RAY DIFFRACTION ANALYSES—COMPOUND II

[Includes only relative intensities greater than 10%]

| Angle 2θ | Interplanar Spacing | Relative Intensity |
|---|---|---|
| 15.9 | 6.57 | 23 |
| 22.4 | 3.97 | 23 |
| 22.8 | 3.90 | 23 |
| 24.0 | 3.70 | 13 |
| 25.1 | 3.54 | 13 |
| 27.2 | 3.28 | 20 |
| 27.9 | 3.20 | 100 |
| 30.2 | 2.96 | 21 |
| 32.4 | 2.76 | 14 |
| 34.7 | 2.58 | 16 |

The infrared absorption spectra of the three compounds prepared as described above were substantially alike and essentially the same as the infrared absorption spectrum of a substantially uniform physical mixture of 50% by weight of dry monopotassium dichloroisocyanurate and 50% by weight of dry trichloroisocyanuric acid, demonstrating that each of the above new compounds is composed of two moieties, one containing monopotassium dichloroisocyanurate and another containing monopotassium dichloroisocyanurate and another containing trichloroisocyanuric acid and that the said moieties are present in a molecular ratio of 1:1 in these compounds.

Although prepared by different processes, the compounds of Examples IV and V are chemically identical and conform to the complex compound hereinbefore designated as Compound II. The above described amounts of precursor compounds consumed, that is, (tripotassium cyanurate, trichloroisocyanuric acid and/or chlorine), in the synthesis of the compounds of Examples IV and V; the substantially identical element analyses, available chlorine content, X-ray diffraction patterns and infrared absorption spectra, make it evident that these products constitute a single novel complex compound containing two moieties, one moiety consisting of monopotassium dichloroisocyanurate and the other consisting of trichloroisocyanuric acid, the said moieties having a ratio of 1:1.

Although as shown heretofore both Compound I and II can be prepared by bringing together and reacting monopotassium dichloroisocyanurate and trichloroisocyanuric acid, Compounds I and II differ from each other and are distinguishable from the aforenoted precursor compounds as is shown in Tables VII and VIII.

TABLE VII

| Compound | Water Solubility at 25° C. (percent) | pH of Saturated Solution | Decomposition Temperature Range, ° C. | Available Chlorine Content Found (percent) | Available Chlorine Calculated (percent) |
|---|---|---|---|---|---|
| Compound I | 2.5 | 4.3 | 260–275 | 66–67 | 66.4 |
| Compound II | 1.0 | 4.1 | [1] 260–275 | 75–77 | 75.8 |
| Monopotassium dichloroisocyanurate | 9.0 | 6.0 | 220–235 | 59–60 | 60.08 |
| Trichloroisocyanuric Acid | 0.6 | 3.0 | [2] 225–230 | 89–91 | 91.54 |
| Dichloroisocyanuric Acid | 0.8 | 2.7 | [2] 230–235 | 70–71 | 71.66 |

[1] Undergoes decrepitation reaction between 170° C.–215° C.
[2] Melts with decomposition.

TABLE VIII.—ELEMENTAL ANALYSES

| Compound | Carbon, Percent | Nitrogen, Percent | Chlorine, Percent | Potassium, Percent |
|---|---|---|---|---|
| Compound I | 15.29 | 17.84 | 33.19 | 13.29 |
| Compound II | 15.36 | 17.92 | 37.88 | 8.34 |
| Monopotassium Dichloroisocyanurate* | 15.25 | 17.78 | 30.07 | 16.56 |
| Trichloroisocyanuric Acid* | 15.48 | 18.06 | 45.77 | |
| Dichloroisocyanuric Acid* | 18.18 | 21.21 | 35.83 | |

*Calculated.

The available chlorine content of each of the above compounds of Examples IV and V was substantially identical and also in conformance with the theoretical available chlorine content as shown in the following table.

TABLE VI.—AVAILABLE CHLORINE—COMPOUND II

Compound: Available chlorine percent
Theoretical (calculated) _____ 75.76
Example IV _____ 75.00
Example V pH 3.5 _____ 75.00
Example V pH 2.8 _____ 75.49

The discovery of the two new potassium-containing cyanurate compounds which, in part, constitute this invention was totally unexpected in view of the reactions which occur when trisodium cyanurate or monosodium dichloroisocyanurate are substituted for tripotassium cyanurate and for monopotassium dichloroisocyanurate in the above described Examples I–V.

When monosodium dichloroisocyanuric acid is used instead of the monopotassium salt and reacted with trichloroisocyanuric acid as in Example I, an isoluble material is obtained which was identified as monohydrogen dichloroisocyanuric acid (also known as dichloroisocyanuric acid).

Monosodium dichloroisocyanurate, acidified with hydrochloric acid under the conditions of Example II also produces dichloroisocyanuric acid. On the other hand when monopotassium dichloroisocyanurate is acidified (as described in Example II) the new potassium-containing complex cyanurate, Compound I, is formed.

When monosodium dichloroisocyanurate is substituted for monopotassium dichloroisocyanurate and reacted with approximately equal molecular proportions of trichloroisocyanuric acid according to the process of Example IV, a product is obtained which when dried was identified as a physical mixture of dichloroisocyanuric acid and trichloroisocyanuric acid.

When trisodium cyanurate is chlorinated to pH 2.8, as in the process of Example V (wherein tripotassium cyanurates was chlorinated to produce a new potassium-containing complex cyanurate Compound II) a precipitate is obtained which when dried was identified as trichloroisocyanuric acid.

EXAMPLE VI

*Process for preparing a mixture of Compounds I and II*

Three grams of trichloroisocyanuric acid were slurried in 6 ml. of distilled water and added to a 300 ml. beaker containing 135 grams of an aqueous solution containing 6.4% by weight of monopotassium dichloroisocyanurate, the resulting molecular ratio of trichloroisocyanuric acid to monopotassium dichloroisosyanurate being a molecular ratio of about 1:2. The resulting mixture was stirred as in Example IV. The precipitate which formed was filtered, washed with water, and dried to constant weight according to the procedure of Example IV.

A dry white crystalline solid weighing 6.5 grams and having an available chlorine content of 71.2% was obtained. An X-ray diffraction analysis, carried out as above-described, showed that the crystalline material was a mixture of Compound I and Compound II. In other words, the diffraction pattern showed interplanar spacings and angles common to both Compound I and II, but such pattern in no way resembled the diffraction pattern of trichloroisocyanuric acid or dichloroisocyanuric acid or monopotassium trichloroisocyanurate.

When monosodium dichloroisocyanurate was substituted for monopotassium dichloroisocyanurate under the above conditons, a physical mixture of trichloroisocyanuric acid and monohydrogen dichloroisocyanuric acid was formed.

Mixtures of Compounds I and II in various ratios with respect to each other can be directly prepared by Example VI to achieve products having an available chlorine content within the ranges of about 67%–74% by varying the amounts of trichloroisocyanuric acid and monopotassium dichloroisocyanuric acid using the general procedure of Example VI. Mixtures of Compounds I and II can also be made using the chlorination process described in Examples III and V. When such chlorination process is used, mixtures of almost any complementing percentages of Compounds I and II can be prepared by controlling the pH at which the material is chlorinated. The pH should be higher than pH 3.5 and lower than pH 4.2 and any pH in this range can be readily obtained by altering the rates at which chlorine and tripotassium cyanurate are added into a reaction vessel containing a slurry of a complex potassium-containing cyanurate compound of this invention.

Thus if a mixture containing relatively large amounts of Compound I and relatively small amounts of Compound II is desired, the chlorination process should be conducted at a pH range of between 4.1 and 4.4. However, if a mixture containing small amounts of Compound I and larger amounts of Compound II is desired, the chlorination process should be carried out at a pH within the range of 3.6 and 3.9.

Although Compounds I and II and mixtures thereof can be prepared by the respective processes described above, it is preferred to prepare Compound I by the chlorination process described in Example III since this continuous process is more economical. Similarly it is preferred to prepare Compound II by the chlorination process described in Example V.

The two anhydrous, crystalline potassium-containing chloroisocyanurate compounds of this invention, either singly, in combination, or when combined with available chlorine containing chlorocyanurates known in the prior art, having utility as active or available chlorine containing materials, in oxidizing, sterilizing, bleaching and sanitizing formulations, such as for example, household laundry compositions, bleaches, scouring powders and sanitizing and dishwashing compositions. Such formulations may contain in addition to the available chlorine containing compounds, neutral and alkaline inorganic salts, for example, detergent builder salts; a minor proportion, usually less than 5% of organic materials such as organic dyes to promote customer acceptance, perfumes, or other odor masking ingredients to make the chlorine odor less noticeable, and surface active agents to promote foaming, wetting, detergency and the like. However, the use of organic compounds in formulations containing high concentrations of available chlorine has been limited in the past because the presence of even small amounts of such organic compounds promote substantial decomposition of the available chlorine compounds resulting in loss of available chlorine and subsequently a reduction in the effectiveness of the formulations.

The above-described novel compounds of the instant invention either singly or as mixtures contain high concentrations of available chlorine and possess a marked degree of stability. The stability toward loss of available chlorine of such novel compounds per se will be readily apparent from the following example.

EXAMPLE VII

Samples of powdered (−100, +140) crystalline monopotassium dichloroisocyanurate, monosodium dichloroisocyanurate, dichloroisocyanuric acid, trichlorocyanuric acid, Compound I and Compound II were separately placed in open wide-mouthed bottles in a humidity cabinet set at 105° F. wherein the relative humidity was 90%. After 90 hours the samples were removed to determine the amount of available chlorine that had been lost. The results are set forth in the following Table IX.

TABLE IX

| Compound: | Loss of available chlorine after 90 hours (percent) |
|---|---|
| Monopotassium dichloroisocyanurate | 1.1 |
| Monosodium dichloroisocyanurate | 13.2 |
| Dichloroisocyanuric acid | 19.4 |
| Trichloroisocyanuric acid | 24.5 |
| Compound I | 0.5 |
| Compound II | 2.5 |

As indicated above the novel potassium containing chloroisocyanurate compounds of the present invention are relatively stable in the presence of neutral and alkaline inorganic compounds, particularly inorganic salts, which are incapable of undergoing oxidation-reduction reactions with the novel compounds of this invention. Thus a wide variety of such type of inorganic compounds or salts such as alkali and/or alkaline earth metal phosphates, silicates, carbonates, aluminates, sulfates and oxides can be used as builders or inert fillers or abrasives in conjunction with the novel compounds of this invention in oxidizing, sterilizing and bleeching formulations. Also specific alkali metal and/or alkaline earth metal salts such as sodium, potassium, lithium, calcium, barium, aluminum iron and titanium salts of the foregoing acid radicals can be used in combination with the available chlorine compounds of this invention. However, neutral to alkaline alkali metal or alkaline earth metal phosphates, silicates, carbonates, chlorides and sulfates are usually used, wherein the alkali metal is usually the sodium, potassium, or lithium salt and calcium and/or barium is usually the alkaline earth metal salt.

More specific examples of such inorganic salts are monovalent alkali metal phosphates including orthophosphates such as di and trisodium orthophosphate, alkali metal pyrophosphates such as tetrasodium pyrophosphate and polyphosphates such as sodium tripolyphosphate; metaphosphates such as sodium trimeta-, sodium hexametaphosphates and Graham's salts.

Examples of inorganic silicates are meta, ortho, di and tetrasilicates such as the sodium potassium and lithium calcium salts thereof and still other examples are the foregoing metal salts of carbonates, sulfates and chlorides. It is preferred, however, to use the sodium, potassium or calcium salts of the aforedescribed phosphates, silicates, carbonates, sulfates and chlorides.

The inorganic compounds used in combination with the novel potasium containing chlorocyanurate complex compounds of this invention can be either water-soluble or water insoluble, depending upon the particular purpose for which the combination is designed. For example, the water soluble polyphosphates, including pyrophosphates are often used as sequestering agents in bleaching formulations; the polyphosphates, silicates, carbonates and sulfates are often used as builders, corrosion inhibitors, diluents and the like in detergent formulations. Insoluble compounds such as dicalcium orthophosphate, calcium carbonate, calcium sulfate, titanium dioxide, silica, etc., may be used as abrasive agents as well as natural mineral abrasives such as talc, feldspar, etc., in scouring powders or other grinding or polishing formulations.

The stability with respect to available chlorine of the novel potasium containing chloriisocyanurate complex compounds with the various inorganic compounds or salts mentioned above is illustrated by the following examples:

EXAMPLE VIII

A mechanical admixture of 3.3% by weight of potassium dichloroisocyanurate, sodium dichloroisocyanurate, dichloroisocyanuric acid, trichloroisocyanuric acid and Compounds I and II, respectively, in a composition composed of equal parts of potassium chloride, sodium carbonate, sodium metasilicate, sodium tripolyphosphate and sodium sulfate were placed in open jars and exposed to a temperature of 90° F. and a relative humidity of 85% for 53 hours. The amount of decomposition as indicated by available chlorine loss is shown in the following table:

TABLE X

| Compound: | Loss of available chlorine after 53 hours (percent) |
| --- | --- |
| Potassium dichloroisocyanurate | 29.6 |
| Sodium dichloroisocyanurate | 48.7 |
| Dichloroisocyanuric acid | 93.5 |
| Trichloroisocyanuric acid | 97.0 |
| Compound I | 17.5 |
| Compound II | 39.0 |

As previously pointed out, the potassium-containing chloroisocyanurate complex compounds of this invention are unique in their excellent stability, with respect to available chlorine, in the presence of organic compounds.

This property is useful in permitting the incorporation of the novel chloroisocyanurate compounds of this invention in formulations containing perfume or odor masking agents such as essential oils, organic sequestering or chelating agents such as the metal salts of ethylenediamine tetra-acetic acid; organic dyes and coloring agents such as those described in Venkataraman, "Chemistry of Synthetic Dyes," Academic Press, Inc., New York, 1952; organic stain, corrosion, or tarnish inhibitors such as those described in U.S. Patents 2,618,603 and 2,618,605; and surface active agents such as foaming agents, detergents, emulsifiers and the like.

As specific examples or perfumes or odor masking agents (essential oils) which may be used in the formulations of the present invention, there may be mentioned oils of wintergreen, pine, palmarosa, sage clary, and rose. Other typical examples of such perfumes, including those set forth above, are described in Kirk and Othmer, "Encyclopedia of Chemical Technology," volume 9 (1952), The Interscience Encyclopedia, Inc., New York, pages 569–591.

As other specific examples of organic sequestering or chelating agents, there may also be included agents such as the acids and water-soluble salts (alkali metal, ammonium and amine) of amino polycarboxylic acid type, i.e., ethylenediamine tetra-acetic acid and nitrilo triacetic acid; the hydroxy substituted carboxylic acid type, i.e., citric acid and gluconic acid; and the organic polyphosphonic acid type such as the alkylene polyphosphonic acids or its alkali metal salts (e.g. methylene diphosphonic acid or its sodium salts and ethylene diphosphonic acid or its sodium salts). The aforementioned examples of sequestering agents and other sequestering agents which may be utilized with the novel chloroisocyanurate compounds of this invention are such as those described in "Organic Sequestering Agents," by Chaberek and Martell, John Wiley and Sons, Incorporated, New York, N.Y. (1959).

Also the novel formulations of the present invention may include, along with the novel chloroisocyanurate compounds, minor amounts of organic dyes (as previously mentioned), coloring agents, or fluorescent organic dyes commonly known in the art as optical brighteners. In regard to the organic dyes or optical brighteners which are also generally known in the art as fluorescent brightening agents or optical bleaching agents (said terms being used interchangeably herein), examples of said brighteners are described in U.S. Patent 2,930,760; "A Study of Fluorescent Dyes," American Dyestuff Reporter, June 28, 1948, volume 37, No. 13, pages 423–432; and "Optical Bleaching Magic White," American Dyestuff Reporter, Aug. 29, 1955, pages 625–630. As examples of the aforementioned optical bleaching agents, there may be mentioned sodium 4,4'-bis(4,6-dianilino-s-triazo-2-ylamino)-2,2' stilbene disulfonate; sodium 2-sulfo-4-(2-napho 1,2-triazolyl) stilbene; Calco acetate fluorescent blue I; and Calcomine fluorescent violet 2G.

Additional materials which may be incorporated in the compositions of the present invention along with the novel chloroisocyanurate compounds in the aforementioned minor amounts include organic stain, corrosion, or tarnish inhibitors such as those described in U.S. Patents 2,618,606 and 2,618,608. As examples of the aforementioned inhibitors and which are found in the aforementioned patents, including U.S. Patents 2,618,603 and 2,618,605, there may be included ethylene thiourea, 1-phenyl imidazolthione (2), melamine, thioparabanic acid, adenine, and 6-nitro indazole and 2-(benzylmercapto)-imidazole. In order to avoid the enlargement of the present specification, the subject matter, relating to organic sequestering agents, optical brighteners, etc., of all the aforementioned publications, including the aforementioned patents, is incorporated herein by reference. The quantity and type of sequestering agents, brighteners, inhibitors, etc. should not be such as to adversely effect the stability of the novel compounds of the present invention when incorporated in the novel formulations. These materials may be used alone or as mixtures thereof in the novel formulations.

In the category of surface active agents there can be included the anionic surfactants, such as the sulfated and the sulfonated alkyl, aryl, and alkylaryl hydrocarbons set forth in U.S. Patent 2,846,398, line 54 of column 3 to line 6 of column 5. There can also be included nonionic surfactants such as those set forth in column 5 of U.S. Patent 2,846,398 and well known cationic surfactants. Other typical examples of such various categories are described in Schwartz and Perry, "Surface Active Agents," Interscience Publishers, New York (1949) and Journal of American Oil Chemists Society, the subject matter of all these publications being incorporated herein by reference.

The preferred organic compounds are those which when incorporated with the novel potassium-containing chloroisocyanurate compounds of this invention in formulations containing 50% or more by weight of the aforedescribed inorganic compounds or salts do not undergo to any appreciable extent an oxidation-reduction reaction with the novel stable chloroisocyanurate compounds and mixtures thereof.

The outstanding stability of the novel compounds of this invention, when used in conjunction with organic and inorganic materials is demonstrated by the following examples.

EXAMPLE IX

Respective mixtures of 3.0% by weight of potassium dichloroisocyanurate, sodium dichloroisocyanurate, dichloroisocyanuric acid, trichloroisocyanuric acid, Compound I, Compound II and a material containing 97.5 parts by weight of silica and 2.5 parts by weight of the condensation product of tridecyl alcohol made by an "oxo" process and about 9 molar proportions of ethylene oxide were placed in an open jar and maintained at a temperature of 90° F. and a relative humidity of 85% for 24 hours. The excellent stability of the compounds of the instant invention is compared with other chlorocyanurates in Table XI.

TABLE XI

| Compound: | Loss of available chlorine after 24 hours (percent) |
|---|---|
| Potassium dichloroisocyanurate | 8.0 |
| Sodium dichloroisocyanurate | 10.0 |
| Dichloroisocyanuric acid | 14.5 |
| Trichloroisocyanuric acid | 16.5 |
| Compound I | 3.9 |
| Compound II | 10.0 |

EXAMPLE X

Respective mixtures of the 3.0% by weight cyanurate compounds of the preceding examples and a composition containing 97.0% by weight of silica and 3.0% by weight of sodium dodecylbenzene sulfonate (85% active) were placed in open wide-mouth bottles and exposed to a temperature of 90° F. and a relative humidity of 85% for 53 hours. The results are summarized in the following table.

TABLE XII

| Compound: | Loss of available chlorine after 53 hours (percent) |
|---|---|
| Potassium dichloroisocyanurate | 3.4 |
| Sodium dichloroisocyanurate | 7.0 |
| Dichloroisocyanuric acid | 8.2 |
| Trichloroisocyanuric acid | 10.1 |
| Compound I | 2.5 |
| Compound II | 4.5 |

EXAMPLE XI

Respective mixtures of the 3.0% by weight of the cyanurate compounds of the preceding examples and compositions containing 97.0% by weight of silica and 3% by weight of an optical brightener [1], sequestering agent [2], or corrosion inhibitor [3], were placed in open wide-mouth bottles and exposed to a temperature of 90° F. and a relative humidity of 85% for 53 hours. The results of this test are summarized in the following table.

TABLE XIII

| Compound | Loss of Available Chlorine After 53 Hours (Percent)—Compound Containing— | | |
|---|---|---|---|
|  | Optical Brightener [1] | Sequestering Agent [2] | Corrosion Inhibitor [3] |
| Potassium dichloroisocyanurate | 3.1 | 3.5 | 3.3 |
| Sodium dichloroisocyanurate | 7.0 | 7.1 | 7.4 |
| Dichloroisocyanuric acid | 9.1 | 8.3 | 9.0 |
| Trichloroisocyanuric acid | 10.6 | 10.3 | 11.1 |
| Compound I | 2.3 | 2.1 | 2.4 |
| Compound II | 3.4 | 3.9 | 3.8 |

[1] E.g., U.S. Patent 2,930,760 fluorescent brightener—sodium 4,4'-bis(4,6-dianilino-s-triazo-2-ylamino)-2,2' stilbene disulfonate.
[2] The sodium salt of ethylenediamine tetraacetic acid.
[3] Ethylene thiourea.

Example XI was repeated; however, the silica was replaced by anhydrous sodium tripolyphosphate which was used with a mixture of an optical brightener, sequestering agent, and a corrosion inhibitor, each of the latter organic compounds being utilized in equivalent amounts, i.e. 1% by weight of the organic compound in the composition containing sodium tripolyphosphate. These mixtures when admixed with the cyanurate compounds were then subjected to the same conditions as set forth in Example XI and the end results were very similar to those results obtained and set forth in the aforementioned Table XIII. Consequently, it is seen from the results obtained in Example XI and its repeated example as described above, that minor amounts of an organic compound such as an optical brightener, sequestering agent, corrosion inhibitor, or mixtures thereof can be readily incorporated along with the novel compounds into the novel formulations of the present invention without any adverse effect on the stability of said formulations.

The concentration of any of the potassium-containing chloroisocyanurate complex compounds and mixtures thereof of the present invention which may be utilized in a particular formulation will depend largely on the specific use for which the formulation is designed and usually will be in the range of 0.1 to about 98% by weight of the formulation. For example, in strong sterilizing, oxidizing, disinfecting or bleaching compositions, the compounds of this invention may comprise a predominant proportion (e.g. up to 90 or 95% or more) of the formulation. In formulations designed for ultimate consumer use (e.g. household formulations such as laundry bleaches, scouring powders and the like) considerably smaller proportions of the novel available chlorine compounds of this invention may be used. For example in a household laundry bleach between about 5% and about 20% by weight of the instant compounds will generally be suitable; with scouring powders from about 20% to as little as 0.05% is often sufficient; with dishwashing compositions between about 1% and 10% is satisfactory.

Although the novel compositions of this invention are remarkably stable in comparison with previously known chlorine compositions containing high concentrations of available chlorine, there is still need for the exercise of some discretion in the formulations of these compounds in conjunction with organic compounds. Thus, by way of example, when the above-described inorganic salts are formulated with organic compounds, it will generally be desirable to include in such formulations a dominant proportion; that is, at least 50% by weight of the total formulation of an alkaline or neutral inorganic compound or salt hereinbefore described to act as an inert diluent for the combination of organic compounds and novel available chlorine containing compound and/or compounds of the present invention. In general it is desirable to have in such composition from about 50% to 99% of inert inorganic diluent, from about 0.05% to about 25% of the above-described organic material and from about 0.05% to about 50% of the novel compounds (singly or in combination) of this invention. For most purposes, however, preferred formulations would contain from about 89%–92% of inert inorganic diluent and from about 0.05–5.0% organic material and from about 0.05–10% of the novel available chlorine containing compounds of this invention.

As further illustrations of useful bleaching, cleansing and sanitizing compositions containing the novel compounds of this invention, the following typical specific formulations are set forth.

TYPICAL HOUSEHOLD LAUNDRY BLEACH

| | Weight percent |
|---|---|
| Sodium tripolyphosphate | 40 |
| Sodium sulfate | 24 |
| Sodium metasilicate | 20 |
| Sodium dodecylbenzene sulfonate | 5 |
| Potassium silicate | 1 |
| Compound I (may also be Compound II or mixtures of I and II) | 10 |

TYPICAL SANITIZING COMPOSITION

| | Weight percent |
|---|---|
| Sodium sulfate | 25 |
| Tetrasodium pyrophosphate | 20 |
| Sodium triployphosphate | 20 |
| Sodium metasilicate | 15 |
| Compound I (may also be Compound II or mixtures of I and II) | 20 |

TYPICAL SCOURING POWDER

| | Weight percent |
|---|---|
| Silica | 90.0 |
| Sodium tripolyphosphate | 5.0 |
| Soda ash | 2.5 |
| Sodium lauryl sulfate | 2.2 |
| Compound I (may also be Compound II or mixtures of I and II) | 0.3 |

TYPICAL DISHWASHING FORMULATION.—(FOR AUTOMATIC DISHWASHER)

| | Weight percent |
|---|---|
| Sodium tripolyphosphate | 45 |
| Sodium sulfate | 2.3 |
| Sodium metasilicate | 2.3 |
| Soda ash | 8 |
| Compound I (may also be Compound II or mixtures of I and II) | 1 |

What is claimed is:

1. A sterilizing, disinfecting, oxidizing, and bleaching composition consisting essentially of a mixture of (a) an organic compound selected from the group consisting of essential oils, organic optical brighteners, organic tarnish inhibitors, and organic sequestering agents and (b) a potassium-containing chloroisocyanurate complex compound selected from the group consisting of [(monotrichloro) tetra - (monopotassium dichloro)] penta - isocyanurate, (mono-trichloro)(monopotassium dichloro) di-isocyanurate and mixtures thereof, the said potassium-containing chloroisocyanurate complex compound being present in an amount in the range of about 0.1% to about 98% by weight of the mixture, said organic compound being further characterized as incapable of undergoing an oxidation-reduction reaction with respect to such potassium-containing chloroisocyanurate complex compound.

2. A sterilizing, disinfecting, oxidizing and bleaching composition consisting essentially of (a) from about 50% to about 99% by weight based on the weight of the composition of an inorganic compound selected from the group consisting of silica and alkali metal phosphates, silicates, carbonates, sulfates, and chlorides; (b) from about 0.05% to about 25% by weight, based on the weight of the composition, of an organic compound selected from the group consisting of essential oils, organic optical brighteners, organic tarnish inhibitors, organic sequestering agents, and mixtures thereof; and (c) from about 0.05% to about 50% by weight, based on the weight of the composition, of a potassium-containing chloroisocyanurate complex compound selected from the group consisting of [(mono-trichloro) tetra-(monopotassium dichlro)] pentaisocyanurate, (mono-trichloro)(monopotassium dichloro) di-isocyanurate, and mixtures thereof, the total weight of (b) and (c) being less than the weight of (a), said inorganic compound and said organic compound both being further characterized as incapable of undergoing an oxidation-reduction reaction with respect to such potassium-containing choloroisocyanurate complex compounds.

3. The composition as set forth in claim 2 wherein the organic compound is the sodium salt of ethylene-diamine tetra-acetic acid.

4. The composition as set forth in claim 2 wherein the organic compound is sodium 4,4'-bis(4,6-dianilino-s-triazo-2-ylamino)-2,2'-stilbene disulfonate.

5. The composition as set forth in claim 2 wherein the organic compound is 2-(benzylmercapto)-imidazole.

6. A sterilizing, disinfecting, oxidizing and bleaching composition consisting essentially of a mixture of an inorganic detergent builder alkali metal phosphate, a compound selected from the group consisting of methylene and ethylene polyphosphonic acids and alkali metal salts thereof, and (mono-trichloro)(monopotassium dichloro) di-isocyanurate, said isocyanurate being present in an amount in the range of about 0.1% to about 98% by weight of said mixture, said inorganic builder phosphates and polyphosphonic compounds being further characterized as incapable of undergoing an oxidation-reduction reaction with respect to said isocyanurate.

7. A sterilizing, disinfecting, oxidizing and bleaching composition consisting essentially of a mixture of (a) from about 89% to about 92% by weight, based on the weight of the mixture, of sodium tripolyphosphate, (b) from about 0.05% to about 10% by weight, based on the weight of the mixture, of [(mono-trichloro) tetra-(monopotassium dichloro)] penta-isocyanurate, (c) from about 0.05% to about 10% by weight, based on the weight of the mixture, of (mono-trichloro)(monopotassium dichloro) di-isocyanurate, and (d) from about 0.05% to about 5.0% by weight, based on the weight of the mixture, of an organic sequestering agent, said penta-isocyanurate and said di-isocyanurate being present in a total amount in the range of about 0.1% to about 98% by weight of said mixture, said organic sequestering agent and said tripolyphosphate being incapable of undergoing an oxidation-reduction reaction with respect to said isocyanurates.

References Cited

UNITED STATES PATENTS 2,897,154  7/1959  Low _____ 252—99
2,913,460  11/1959  Brown et al. _____ 252—99 XR LEON D. ROSDOL, *Primary Examiner.*

M. WEINBLATT, *Assistant Examiner.*

UNITED STATES PATENT OFFICE
CERTIFICATE OF CORRECTION

Patent No. 3,350,317                         October 31, 1967

William F. Symes

It is hereby certified that error appears in the above numbered patent requiring correction and that the said Letters Patent should read as corrected below.

Column 2, lines 47 to 55, the formula should appear as shown below instead of as in the patent:

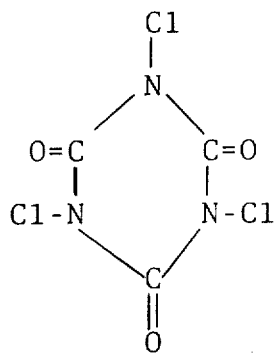 · 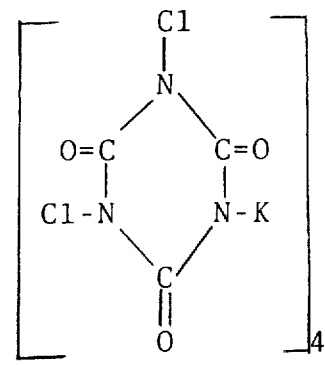

column 5, line 59, for "6.04-4.3" read -- 6.0-4.3 --.

Signed and sealed this 3rd day of December 1968.

(SEAL)
Attest:

EDWARD M. FLETCHER, JR.                    EDWARD J. BRENNER
Attesting Officer                            Commissioner of Patents